(12) United States Patent
Middaugh et al.

(10) Patent No.: US 6,779,607 B2
(45) Date of Patent: Aug. 24, 2004

(54) METHOD AND APPARATUS FOR ACIDIZING A SUBTERRANEAN WELL FORMATION FOR IMPROVING HYDROCARBON PRODUCTION

(75) Inventors: Richard L. Middaugh, Duncan, OK (US); Jim B. Surjaatmadja, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 0 days.

(21) Appl. No.: 10/607,348

(22) Filed: Jun. 26, 2003

(65) Prior Publication Data

US 2004/0089452 A1 May 13, 2004

Related U.S. Application Data

(63) Continuation of application No. 09/966,630, filed on Sep. 28, 2001, now Pat. No. 6,725,933.

(51) Int. Cl.⁷ .......................... E21B 43/26; E21B 7/18; E21B 43/25
(52) U.S. Cl. ................... 166/307; 166/300; 166/308.1; 166/309
(58) Field of Search ............................. 166/292, 177.5, 166/279, 280, 297, 298, 222, 300, 307, 308.1, 309

(56) References Cited

U.S. PATENT DOCUMENTS

| | | | |
|---|---|---|---|
| 4,480,696 A | 11/1984 | Almond et al. | |
| 4,554,082 A | 11/1985 | Holtmyer et al. | |
| 5,203,413 A | 4/1993 | Zerhboub | |
| 5,335,724 A | 8/1994 | Venditto et al. | |
| 5,361,856 A | 11/1994 | Surjaatmadja et al. | |
| 5,392,859 A | 2/1995 | Adams et al. | |
| 5,494,103 A | 2/1996 | Surjaatmadja et al. | |
| 5,499,678 A | 3/1996 | Surjaatmadja et al. | |
| 5,765,642 A | 6/1998 | Surjaatmadja | |
| 6,662,874 B2 * | 12/2003 | Surjaatmadja et al. | 166/309 |
| 6,719,054 B2 * | 4/2004 | Cheng et al. | 166/300 |
| 2003/0062162 A1 * | 4/2003 | Middaugh et al. | 166/300 |

* cited by examiner

*Primary Examiner*—David Bagnell
*Assistant Examiner*—Brian Halford
(74) *Attorney, Agent, or Firm*—Robert A. Kent; Warren B. Kice

(57) ABSTRACT

A method and apparatus or treating a subterranean well formation to stimulate the production of hydrocarbons utilizing foam diversion in the well formation.

21 Claims, 2 Drawing Sheets

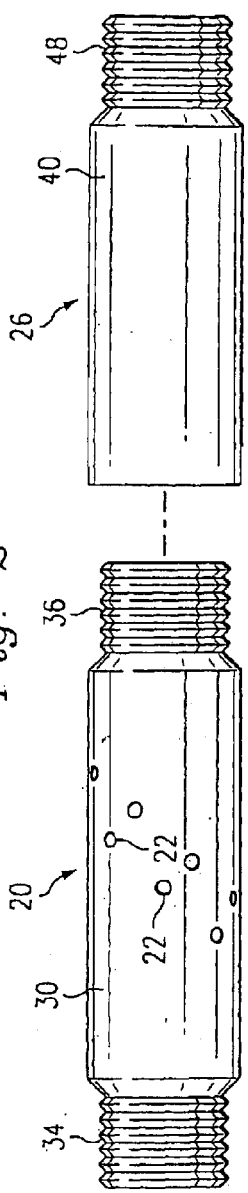
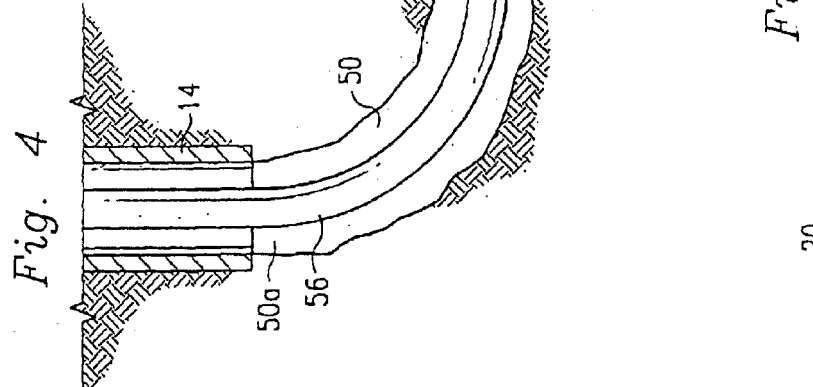
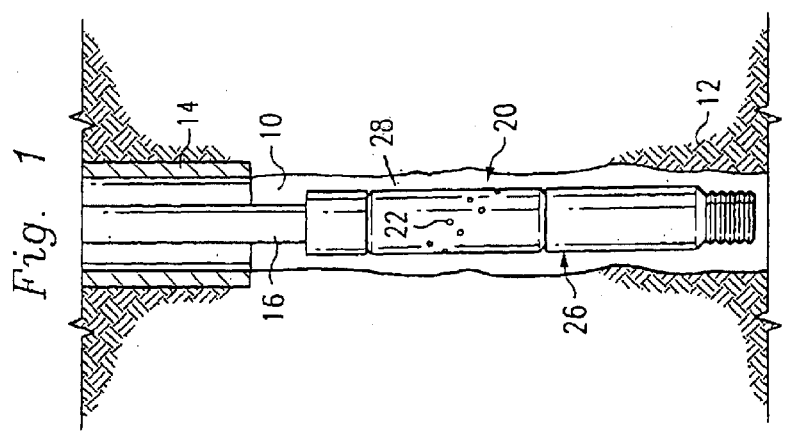

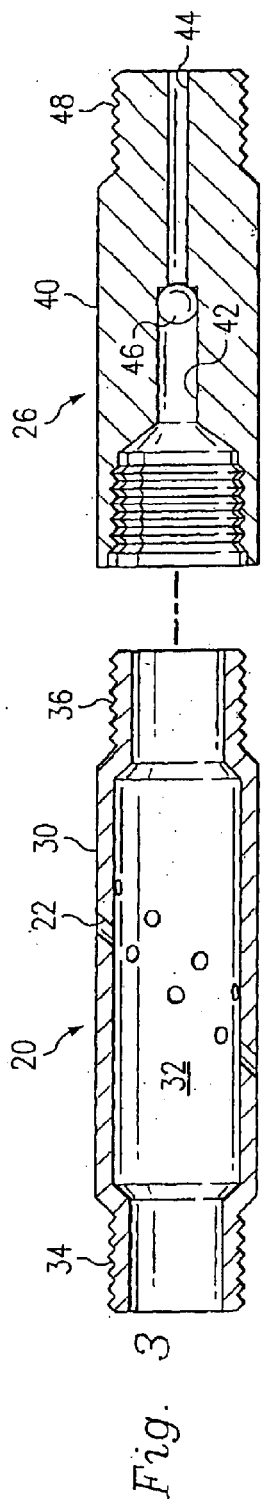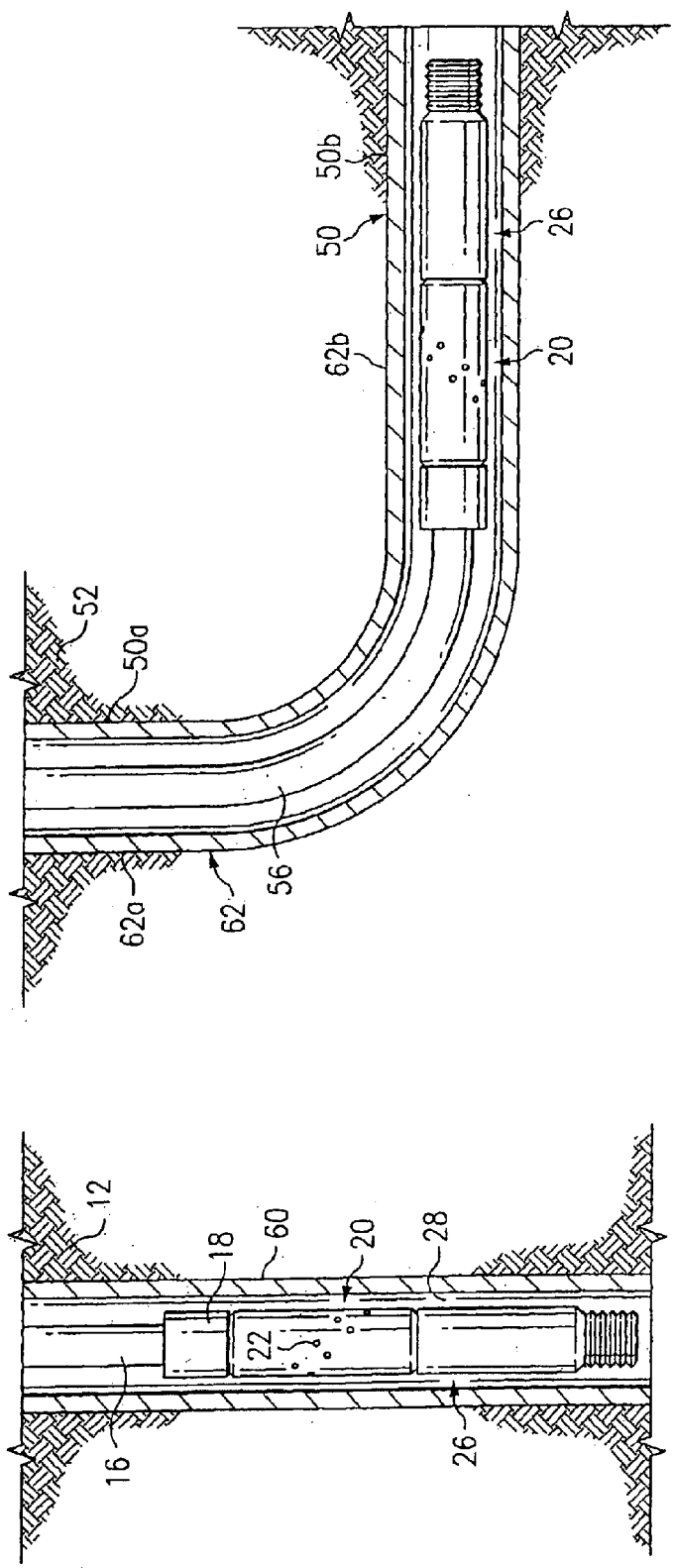

US 6,779,607 B2

METHOD AND APPARATUS FOR ACIDIZING A SUBTERRANEAN WELL FORMATION FOR IMPROVING HYDROCARBON PRODUCTION

CROSS REFERENCE

This application is a continuation of U.S. application Ser. No. 09/966,630, filed on Sep. 28, 2001 now U.S. Pat. No. 6,725,933.

BACKGROUND

This disclosure relates to a method and apparatus for treating a subterranean well formation to stimulate the production of hydrocarbons and, more particularly, such a method and apparatus utilizing foam diversion in the well formation.

Several techniques have evolved for treating a subterranean well formation to stimulate hydrocarbon production. For example, hydraulic fracture acidizing methods have often been used according to which a portion of a formation to be stimulated is isolated using conventional packers, or the like, and a stimulation fluid containing gels, acids, sand slurry, and the like, is pumped through the well bore into the isolated portion of the formation. The pressurized stimulation fluid pushes against the formation at a very high force to establish and extend cracks on the formation.

Also, squeezing methods have been used which involve introducing stimulation fluids containing acids to formations at a pressure that is higher than the formation pressure (but not as high as the fluid pressure in the fracturing methods), causing the fluid to infiltrate the pores in the formation and react with the formation to enlarge the pores.

In these methods, foam diversion is often used according to which foam is created and used to plug pores in the formation and thus promote the spreading of the fluids over a relatively large surface area of the formation. To this end, conventional foaming equipment is provided on the ground surface that creates a foam, which is then pumped downhole. Foams, however, have much larger friction coefficients and reduced hydrostatic effects, both of which severely increase the required pressures to treat the well. Moreover, using conventional procedures, a foam generated at the surface is sent through the same conduit as the other liquids. Therefore, if a foam is needed, it cannot be introduced into the formation until all the liquids used previously are cleared from the wellbore. The gas into the foam generator could be changed, but this change will not occur until all previously delivered foam clears the wellbore. This, of course, is very time-consuming.

SUMMARY

According to an embodiment of the present invention a method for acid treatment of a subterranean well formation is provided to stimulate the production of hydrocarbons which utilizes foam diversion which can be initiated substantially instantaneously in situ.

BRIEF DESCRIPTION OF THE DRAWINGS

FIG. 1 is a sectional view of a fracturing system according to an embodiment of the present invention, shown in a vertical wellbore.

FIG. 2 is an exploded elevational view of two components of the systems of FIG. 1.

FIG. 3 is a cross-sectional view of the components of FIG. 2.

FIG. 4 is a sectional view of a fracturing system according to an embodiment of the present invention, shown in a wellbore having a horizontal deviation.

FIG. 5 is a view similar to that of FIG. 1 but depicting an alternate embodiment of the fracturing system of the present invention shown in a vertical wellbore.

FIG. 6 is a view similar to that of FIG. 5, but depicting the fracturing system of the embodiment of FIG. 5 in a wellbore having a horizontal deviation.

DETAILED DESCRIPTION

Referring to FIG. 1, a stimulation system according to an embodiment of the present invention is shown installed in an underground, substantially vertically-extending, wellbore 10 that penetrates a hydrocarbon producing subterranean formation 12. A casing 14 extends from the ground surface (not shown) into the wellbore 10 and terminates above the formation. The stimulation system includes a work string 16, in the form of piping or coiled tubing, that also extends from the ground surface and through the casing 14. The work string 16 could be placed just above the lower end of the casing 14 or could extend beyond, or below, the end of the casing 14 as viewed in FIG. 1. One end of the work string 16 is connected to one end of a tubular jet sub 20 in a manner to be described. The jet sub has a plurality of through openings 22 machined through its wall that form discharge jets which will be described in detail later.

A valve sub 26 is connected to the other end of the jet sub 20, also in a manner to be described. The end of the work string 16 at the ground surface is adapted to receive a gas, such as nitrogen or carbon dioxide.

The valve sub 26 is normally closed to cause flow of the gas to discharge from the jet sub 22. The valve sub 26 is optional and is generally required for allowing emergency reverse circulation processes, such as during screenouts, equipment failures, etc. An annulus 28 is formed between the inner surface of the wellbore 10 and the outer surfaces of the workstring 16 and the subs 20 and 26. Several different types of fluids are pumped into the annulus 28 from the ground, for reasons to be described.

The respective axes of the jet sub 20 and the valve sub 26 extend substantially vertically in the wellbore 10. When the gas is pumped through the work string 16, it enters the interior of the jet sub 20 and discharges through the openings 22, into the wellbore 10, and against the formation 12.

Details of the jet sub 20 and the ball valve sub 26 are shown in FIGS. 2 and 3. The jet sub 20 is formed by a tubular housing 30 that includes a longitudinal flow passage 32 extending through the length of the housing. The openings 22 extend through the wall of the casing in one plane and can extend perpendicular to the axis of the casing as shown in FIG. 2, and/or at an acute angle to the axis of the casing as shown in FIG. 3, and/or aligned with the axis (not shown). Thus, the gas from the work string 16 enters the housing 30, passes through the passage 32 and is discharged from the openings 22, with the discharge pattern being in the form of a disc extending around the housing 30.

If the gas is introduced into the work string 16, and discharges through the openings 22, at a relatively high pressure, under conditions to be described, a jetting effect is achieved. This creates a relatively high differential discharge pressure, which accelerates the stimulation fluid in the annulus 28 to a relatively high velocity. Thus a relatively high shear occurs between the jetted gas and the fluid in the annulus 28. This high shear causes the development of a high quality foam in situ for reasons to be explained.

Two tubular nipples 34 and 36 are formed at the respective ends of the housing 30 and preferably are formed integrally with the housing. The nipples 34 and 36 have a smaller diameter than that of the housing 30 and are externally threaded, and the corresponding end portion of the work string 16 (FIG. 1) is internally threaded to secure the work string to the housing 30 via the nipple 34.

The valve sub 26 is formed by a tubular housing 40 that includes a first longitudinal flow passage 42 extending from one end of the housing and a second longitudinal flow passage 44 extending from the passage 42 to the other end of the housing. The diameter of the passage 42 is greater than that of the passage 44 to form a shoulder between the passages, and a ball 46 extends in the passage 42 and normally seats against the shoulder.

An externally threaded nipple 48 extends from one end of the casing 40 for connection to other components (not shown) that may be used in the stimulation process, such as sensors, recorders, centralizers and the like. The other end of the housing 40 is internally threaded to receive the externally threaded nipple 36 of the jet sub 20 to connect the housing 40 of the valve sub 26 to the housing 30 of the jet sub.

It is understood that other conventional components, such as centering devices, BOPs, strippers, tubing valves, anchors, seals etc. can be associated with the system of FIG. 1. Since these components are conventional and do not form any part of the present invention, they have been omitted from FIG. 1 in the interest of clarity.

In operation, the ball 46 is dropped into the work string 16, passes through the passage 42, and seats on the shoulder between the passages 42 and 44. A gas, such as nitrogen or carbon dioxide is pumped down the work string 16 and the fluid pressure thus builds up in the subs 20 and 26. This pumping of the gas is continued until the system is fully charged at which time it is discontinued.

A preflush fluid is then pumped down the annulus 28 at pressures between the pressure of the pores of the formation and the fracture pressure. This preflush fluid removes carbonates and/or sweeps away harmful minerals from the wellbore 10 which would otherwise cause precipitates when contacting hydrofluoric acid at a later stage. The preflush fluid can be non-acidic, acidic, or both.

A stimulation fluid is then pumped down the annulus 28 at pressures at the reservoir 12 between the pore pressure and the fracture pressure. The stimulation fluid, can be in the form of a conventional acid that is used in squeezing or matrix acidizing, along with various additives that are well known in the art. Typical acids include mineral or organic acids, such as hydrochloric acid, hydroflouric acid, formic acid, or acetic acid, or a blend thereof. The stimulation fluid reacts with the formation to cause fracturing and squeezing, in a conventional manner.

An afterflush fluid is then pumped down the annulus 28 to sweep the hydrofluoric acid out of the wellbore. This afterflush fluid is generally non-acidic and can contain foaming agents for reasons to be described. It is noted that, during the above, some of the above gas may be present in the workstring 16 near or at its end, and some of the gas may have leaked into the annulus 28 as a result of the charging of the system, as described above. This gas is at a concentration, or pressure, to prevent the above fluids from rising up into the workstring 16, but is not high enough in concentration to create a viscous foam when it mixes with the fluid at the openings 22 in the jet sub 20.

After a predetermined pumping of the afterflush fluid, a diversion stage is initiated to insure that the fluid is spread over a relative large surface area of the formation. To this end, the pumping rate of the gas into the workstring 16 and through the openings 22 is initiated at an increased rate compared to the initial charging of the system, as discussed above. One of the following steps are taken to insure that foam is created in the annulus 28 at or below the jet sub 20 when the gas discharging from the openings 22 mixes with the afterflush fluid in the annulus 28:

1) the differential pressure of the gas across the openings 22 will be high enough to create a homogeneous foam;
2) a foaming agent is added to the fluid; and/or
3) the gas-to-liquid ratio will be high enough to create a viscous foam.

The foam thus formed is directed to the formation and is forced into the pores thereof, creating a barrier so that the fluids of the next stage, or cycle, to be described are redirected to other untreated portions of the formation.

During this diversion stage, pressure increases or decreases occurring at the reservoir face 12 are monitored at the surface. Changes at the surface can be made with respect to either the fluid or gas rate to change the downhole foam's viscosity for fluid loss effects and stage sizes.

Once the desired diversion is accomplished, the above steps are repeated in another cycle and the above-mentioned barriers created by the foam caused by the diversion enables the fluid, and particularly, the stimulation fluid, to be spread over a relatively large surface area of the formation. Thus, in accordance with the foregoing, the foam is generated in situ on demand and substantially instantaneously.

The accelerated gas flow can be computed as follows:

Assuming Q is quality, $V_g$ is the volumetric flow rate of gas at a certain pressure (in this example, pressure effects and gas expansion effects are ignored for clarity purposes; and it can be included in the future using common engineering know how) and $V_l$ is the liquid rate; $V_{g1}$ is the gas rate at $Q_1$, and $V_{g2}$ at $Q_2$; and dV is equal to ($V_{g2}-V_{g1}$), then, knowing that $V_g=(Q*V_l)/(1-Q)$, the eventual gas flow can be computed at $Q_2$; which is $V_{g2}=(Q_2*V_l)/(1-Q_2)$. In order to create the downhole step change and deliver the volume relatively quickly, this volume is $V_{ADD}=dV*V_{PIPE}/V_{g2}$; where $V_{PIPE}$ is the total volume of the conduit carrying gas. $V_{ADD}$ must be delivered in addition to $V_{g2}$ as quickly as possible.

After the above operations, if it is desired to clean out spent acid or foreign material such as debris, pipe dope, etc. from the wellbore 10, the work string 16, and the subs 20 and 26, the pressure of the stimulation fluid in the work string 16 is reduced and a cleaning fluid, such as water, at a relatively high pressure, is introduced into the annulus 28. After reaching a depth in the wellbore 10 below the subs 20 and 26, this high pressure cleaning fluid flows in an opposite direction to the direction of the stimulation fluid discussed above and enters the discharge end of the flow passage 44 of the valve sub 26. The pressure of the cleaning fluid forces the ball valve 46 out of engagement with the shoulders between the passages 42 and 44 of the sub 26. The ball valve 46 and the cleaning fluid pass through the passage 42, the jet sub 20, and the work string 16 to the ground surface. This circulation of the cleaning fluid cleans out the foreign material inside the work string 16, the subs 20 and 26, and the well bore 10.

FIG. 4 depicts a stimulation system, including some of the components of the system of FIGS. 1–3 which are given the same reference numerals. The system of FIG. 4 is installed in an underground wellbore 50 having a substantially vertical section 50a extending from the ground surface and a deviated, substantially horizontal section 50b that extends from the section 50a into a hydrocarbon producing subterranean formation 52. As in the previous embodiment, the casing 14 extends from the ground surface into the wellbore section 50a.

The stimulation system of FIG. 4 includes a work string 56, in the form of piping or coiled tubing, that extends from the ground surface, positioned at the lower portion of casing 14. As in the previous embodiment, gas, such as nitrogen, is introduced into the end of the work string 56 at the ground surface (not shown); while a stimulation fluid, described above, is pumped into the annulus of wellbore 50. One end of the tubular jet sub 20 is connected to the other end of the work string 56 in the manner described above for receiving and discharging the gas into the wellbore section 50b and into the formation 52 in the manner described above. The valve sub 26 is connected to the other end of the jet sub 20 and controls the flow of the gas through the jet sub in the manner described above. The respective axes of the jet sub 20 and the valve sub 26 extend substantially horizontally in the wellbore section 50b so that when the gas is pumped through the work string 56, it enters the interior of the jet sub 20 and is discharged, in a substantially radial or angular direction, through the wellbore section 50b and against the formation 52 to create a foam with the gas in the wellbore 50. The horizontal or deviated section of the wellbore is completed openhole and the operation of this embodiment is identical to that of FIG. 1. It is understood that, although the wellbore section 50b is shown extending substantially horizontally in FIG. 4, the above embodiment is equally applicable to wellbores that extend at an angle to the horizontal.

In connection with formations in which the wellbores extend for relatively long distances, either vertically, horizontally, or angularly, the jet sub 20, the valve sub 26 and workstring 56 can be initially placed at the toe section (i.e., the farthest section from the ground surface) of the well. The acid spotting and squeezing process discussed above can then be repeated numerous times throughout the horizontal wellbore section, such as every 100 to 200 feet.

The embodiment of FIG. 5 is similar to that of FIG. 1 and utilizes many of the same components of the latter embodiments, which components are given the same reference numerals. In the embodiment of FIG. 5, a casing 60 is provided which extends from the ground surface (not shown) into the wellbore 10 formed in the formation 12. The casing 60 extends for the entire length of that portion of the wellbore in which the workstring 16 and the subs 20 and 26 extend. Thus, the casing 60, as well as the axes of the subs 20 and 26 extend substantially vertically. The casing 60 must be either preperforated or perforated using conventional means; or it could be hydrajetted with sand using the jet sub 20. Optionally, inside the casing 60 wire screens could be installed and packed with gravel in a manner well known in the art. Then the operation described in connection with the embodiments of FIGS. 1–3 above, is initiated and the mixture of stimulation fluid and foamed gas discharge, at a relatively high velocity, through the openings 22, through the above openings in the casing 60, and against the casing 60 to generate foam and squeeze it in the manner discussed above. Otherwise the operation of the embodiment of FIG. 5 is identical to those of FIGS. 1–4.

The embodiment of FIG. 6 is similar to that of FIG. 4 and utilizes many of the same components of the latter embodiments, which components are given the same reference numerals. In the embodiment of FIG. 6, a casing 62 is provided which extends from the ground surface (not shown) into the wellbore 50 formed in the formation 52. The casing 62 extends for the entire length of that portion of the wellbore in which the workstring 56 and the subs 20 and 22 are located. Thus, the casing 62 has a substantially vertical section 62a and a substantially horizontal section 60b that extend in the wellbore sections 50a and 50b, respectively. The subs 20 and 26 are located in the casing section 62b and their respective axes extend substantially horizontally. The casing section 62b must be either preperforated or perforated using conventional means; or it could be hydrajetted with sand using the jet sub 20. Optionally, inside the casing section 62b wire screens could be installed and packed with gravel in a manner well known in the art. Then the stimulation operation described in connection with the embodiments of FIGS. 1–3, above, is initiated with the mixture of stimulation fluid and gas discharging, at a relatively high velocity, through the above openings in the casing 62, and against the formation 12 to fracture squeeze it in the manner discussed above. Otherwise the operation of the embodiment of FIG. 6 is identical to those of FIGS. 1–3.

Equivalents and Alternatives

It is understood that variations may be made in the foregoing without departing from the scope of the invention. For example, although the above technique was described in connection with a process to matrix acidize sandstone reservoirs, it is understood that it is not exclusive to matrix sandstone acidizing with hydrofluoric acid, and can be used in carbonate matrix acidizing with other type acids which are compatible with carbonate reservoirs. Also, a variety of other fluids can be used in the annulus 28, including clean stimulation fluids, liquids that chemically control clay stability, and plain, low-cost fluids. Further, the liquids may be injected through the workstring 16, while the gas is pumped into the annulus 28. Moreover, it may be decided that the dispensing of the reactive fluids, such as the acids, be spotted at different positions of the well. To do this, position of the jet sub 20 may be far below the casing 14 as shown in FIG. 1. Still further, the above preflushes and afterflushes can be acidic or not acidic.

Also, the gas can be premixed with some liquids prior to entering the work string 16 for many reasons such as cost reduction and increasing hydrostatic pressure. Moreover the makeup of the stimulation fluid can be varied within the scope of the invention. Further, the particular orientation of the wellbores can vary from completely vertical to completely horizontal. Still further, the openings 22 in the sub 20 could be replaced by separately installed jet nozzles that are made of exotic materials such as carbide mixtures for increased durability.

Although only a few exemplary embodiments of this invention have been described in detail above, those skilled in the art will readily appreciate that many other modifications are possible in the exemplary embodiments without materially departing from the novel teachings and advantages of this invention. Accordingly, all such modifications are intended to be included within the scope of this invention as defined in the following claims. In the claims, means-plus-function clauses are intended to cover the structures described herein as performing the recited function and not only structural equivalents, but also equivalent structures.

What is claimed is:

1. A method of stimulating a downhole formation comprising:

deploying a plurality of jet nozzles on a work string and
locating the nozzle in a spaced relation to the wall of the formation to form an annulus between the nozzles and the formation, pumping gas into the workstring to build up the fluid pressure in the nozzles;

discontinuing the step of pumping when the nozzles are fully charged;

pumping a stimulation fluid down the annulus so that the stimulation fluid reacts with the formation, pumping additional afterflush fluid down the annulus to sweep the stimulation fluid out of the wellbore; and pumping additional gas into the workstring and through the openings so that the additional gas mixes with the afterflush fluid in the annulus to form a foam.

2. The method of claim 1 wherein the additional gas is pumped into the workstring after a predetermined pumping of the afterflush fluid.

3. The method of claim 1 wherein the pumping rate of the additional gas is greater than the initial pumping rate of the gas.

4. The method of claim 1 further comprising establishing a sufficiently high differential pressure of the gas across the openings to promote the formation of the foam.

5. The method of claim 1 further comprises adding a foaming agent to the fluids to promote the formation of the foam.

6. The method of claim 1 further comprises establishing a sufficiently high ratio of the gas to the afterflush fluid to promote the formation of the foam.

7. The method of claim 1 further comprising monitoring pressure increases decreases occurring at the formation face and changing the fluid or gas ate to change the foams viscosity.

8. The method of claim 1 further comprising repeating the above steps in another cycle.

9. The method of claim 8 further comprising directing the foam to the formation to create a barrier so that the fluids of the other cycle are redirected other untreated portions of the formation.

10. The method of claim 9 wherein the barrier enables the fluid to be spread over a relatively large surface area of the formation.

11. The method of claim 1 further comprising pumping a preflush fluid down the annulus.

12. The method of claim 11 wherein the step of pumping the preflush fluid is before the step of pumping the stimulation fluid.

13. The method of claim 11 wherein the preflush fluid is pumped down the annulus at a pressure between the fluid pressure at the pores of the formation and the pressure required to fracture the formation.

14. The method of claim 11 wherein the preflush fluid removes carbonate and/or sweeps away minerals from the wellbore.

15. The method of claim wherein the preflush fluid is non-acidic and/or acidic.

16. The method of claim 1 wherein the pressure of the stimulation fluid at the formation is between the pressure at the pores of the formation and the pressure required to fracture the formation.

17. The method of claim 1 wherein the stimulation fluid comprise an acid and least one additive.

18. The method of claim 17 wherein the acid includes mineral or organic acids taken from the group consisting of hydrochloric acid, hydroflouric acid, formic acid, or acetic acid, and a blend thereof.

19. The method of claim 1 wherein the foam is created in the annulus at or below the jet nozzles.

20. The method of claim 1 wherein the afterflush fluid is non-acidic and comprises foaming agents.

21. The method of claim 1 wherein the step of pumping the afterflush fluid is before the step of pumping the stimulation fluid.

* * * * *